US008784016B2

(12) United States Patent
Gamble

(10) Patent No.: US 8,784,016 B2
(45) Date of Patent: Jul. 22, 2014

(54) ROTARY CUTTING TOOL WITH VIBRATION DAMPING DEVICE

(75) Inventor: Kevin Michael Gamble, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 373 days.

(21) Appl. No.: 13/174,836

(22) Filed: Jul. 1, 2011

(65) Prior Publication Data

US 2013/0004250 A1 Jan. 3, 2013

(51) Int. Cl.
*B23B 47/00* (2006.01)
(52) U.S. Cl.
USPC .......................................... 408/143; 409/141
(58) Field of Classification Search
USPC ................... 408/143; 409/141; 407/40, 47
See application file for complete search history.

(56) References Cited

U.S. PATENT DOCUMENTS

| 2,051,954 | A | * | 8/1936 | Leland | 408/143 |
|---|---|---|---|---|---|
| 2,591,115 | A | | 4/1952 | Austin | |
| 2,960,189 | A | | 11/1960 | Osburn | |
| 3,164,041 | A | * | 1/1965 | Carlstedt | 408/144 |
| 3,207,009 | A | * | 9/1965 | Carlstedt | 408/143 |
| 3,207,014 | A | | 9/1965 | Carlstedt | |
| 3,230,833 | A | * | 1/1966 | Shurtliff | 409/141 |
| 3,559,512 | A | * | 2/1971 | Aggarwal | 408/143 |
| 3,582,226 | A | * | 6/1971 | Shurtliff | 408/143 |
| 3,601,229 | A | * | 8/1971 | Shurtliff | 188/380 |
| 3,690,414 | A | * | 9/1972 | Aggarwal et al. | 188/378 |
| 3,938,626 | A | * | 2/1976 | Hopkins | 188/378 |
| 4,553,884 | A | * | 11/1985 | Fitzgerald et al. | 408/143 |
| 4,979,851 | A | | 12/1990 | Hunt | |
| 4,998,851 | A | | 3/1991 | Hunt | |
| 6,929,431 | B2 | | 8/2005 | Bergholt et al. | |
| 7,028,997 | B2 | | 4/2006 | Takahashi et al. | |
| 7,490,536 | B2 | | 2/2009 | Murakami et al. | |
| 7,591,209 | B2 | | 9/2009 | Murakami et al. | |
| 7,661,912 | B2 | | 2/2010 | Onozuka et al. | |
| 2003/0147707 | A1 | * | 8/2003 | Perkowski | 407/30 |
| 2003/0223828 | A1 | * | 12/2003 | Craig | 407/35 |
| 2005/0084341 | A1 | | 4/2005 | Long, II et al. | |

FOREIGN PATENT DOCUMENTS

| DE | 672152 C | 2/1939 |
|---|---|---|
| DE | 1675652 B | 8/1971 |
| DE | 2434196 A1 | 2/1975 |
| DE | 102006005092 A1 | 8/2007 |
| DE | 102009009212 B3 | 6/2010 |
| EP | 2316599 A1 | 5/2011 |

* cited by examiner

*Primary Examiner* — Andrea Wellington
*Assistant Examiner* — Brendan Ayer
(74) *Attorney, Agent, or Firm* — Larry R. Meenan, Esq.

(57) ABSTRACT

A rotary cutting tool includes a cutter body having a head, a shank, and a cavity extending along a central, longitudinal axis of the cutter body. The head includes at least one cutting insert mounted in a pocket adjacent to a chip groove. A vibration damping device is disposed within the cavity. The vibration damping device includes a stop member, a threaded fastener, weight elements, and a biasing member. At least one, if not all of the weight elements have different outside diameters to cause the weight elements to vibrate in the cavity at different frequencies. At least some of the frequencies of the weight elements are different than a fundamental chatter frequency of the cutting tool, thereby dampening vibration of the rotary cutting tool during a machining operation.

20 Claims, 5 Drawing Sheets

ROTARY CUTTING TOOL WITH VIBRATION DAMPING DEVICE

BACKGROUND OF THE INVENTION

In conventional rotary cutting tools, the peripheral cutting edges are designed to be equally spaced in order to allow even loading on the tool body as a whole. For this reason, the flutes of conventional cutting tools are of the same size and shape which allows equal load distribution among the cutting edges.

In general, rotary cutting tools are designed with multiple flutes spaced symmetrically around the circumference of the tool where the flutes run along a partial length of the tool ending at the tool shank. The tool shank is the portion of the tool that is mounted in a machine tool and the fluted portion is the portion of the tool that engages the workpiece. The total number of flutes may vary, and the flutes may be formed to extend either parallel to the longitudinal rotational axis of the tool or more commonly to extend about the rotational axis as a helix. In a helical arrangement, the cutting edges defined by the flutes are each described by a "helix angle," which is the angle formed by a line tangent to the helix and a line parallel to the rotational axis of the tool.

Conventional rotary cutting tools perform adequately at conventional speeds (RPM) and feeds, however, at speeds and feeds higher than conventional, which is desirable for productivity, considerable performance decay is experienced. This performance decay is directly attributable to the presence and magnitude of vibration, specifically resonant vibration, as cutting force increases. At increased speeds and/or feeds, conventional helical and straight-fluted tools induce resonance, whereby the action of the tool cutting a workpiece has a tendency to enhance potential oscillatory energy when the frequency of the oscillations matches the system's natural frequency of vibration (its resonant frequency) or a harmonic thereof. The occurrence of uncontrolled resonant vibration inevitably results in a condition commonly referred to as "chatter," which results in poor tool performance both in terms of life expectancy and workpiece quality. This is an undesirable occurrence.

Several approaches to solving the problem of chatter attempt to minimize the occurrence and resultant effect of resonant frequency vibration. This is generally accomplished by creating an irregular form on or in the leading edge of the flutes, thereby interrupting the tendency of the system to create an uncontrolled oscillation. Additionally, these approaches may also include an asymmetrical arrangement of the flutes around the periphery (circumferential index) of the tool in order to further interrupt resonant frequency vibration. The ultimate goal of this activity is to prolong tool life by limiting the destructive characteristics of vibration at higher than conventional speeds and feeds. It is not desirable to alter rotational speeds of a machine tool and rate of advance speeds of a cutting tool as such steps may interfere with optimal productivity.

SUMMARY OF THE INVENTION

The problem of excessive chatter in a rotary cutting tool, such as a helical end mill, is solved by disposing a vibration damping device having a plurality of weight elements with varying outside diameters within a cavity of the rotary cutting tool.

In one aspect, a rotary cutting tool comprises a cutter body having a forward end, a rearward end. The cutter body includes a head, a shank, and a cavity extending from the rearward end toward the forward end along a central, longitudinal axis of the cutter body. The cavity having threads at one end thereof. The head includes at least one chip groove extending rearwardly from the forward end. The head further includes at least one cutting insert mounted in a pocket along the at least one chip groove. The rotary cutting tool further includes a vibration damping device disposed within the cavity. The vibration damping device includes a stop member at one end, a threaded fastener at an opposite end, a plurality of weight elements disposed between the stop member and the threaded fastener, and a biasing member disposed between the stop member and the plurality of weight elements. At least one of the plurality of weight elements has an outside diameter that is different than an outside diameter of another one of the plurality of weight elements to cause the plurality of weight elements to vibrate in the cavity at a plurality of different frequencies, wherein at least some of the plurality of frequencies are different than a fundamental chatter frequency of the cutting tool, thereby dampening vibration of the rotary cutting tool during a machining operation.

In another aspect, a helical end mill comprises a cutter body having a forward end, a rearward end, the cutter body including a head, a shank, and a cavity extending from the rearward end toward the forward end along a central, longitudinal axis of the cutter body. The head further includes at least one cutting insert mounted on a pocket adjacent a helical chip flute. A vibration damping device is disposed within the cavity. The vibration damping device includes a stop member at one end, a threaded fastener at an opposite end capable of being threadingly received within the cavity, a plurality of weight elements disposed between the stop member and the threaded fastener, and a spring disposed between the stop member and the plurality of weight elements for biasing the plurality of weight elements. The plurality of weight elements being cylindrical in shape and having a different outside diameter from each other to cause the plurality of weight elements to vibrate in the cavity at a plurality of different frequencies, wherein at least some of the plurality of frequencies of the plurality of weight elements are different than a fundamental chatter frequency of the cutting tool, thereby dampening vibration of the rotary cutting tool during a machining operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a version of a helical end mill and a cutting insert therefor. However, it is noted that the helical end mill and cutting insert may be configured to suit the specific application and is not limited only to the example in the illustrations.

Figure 1:
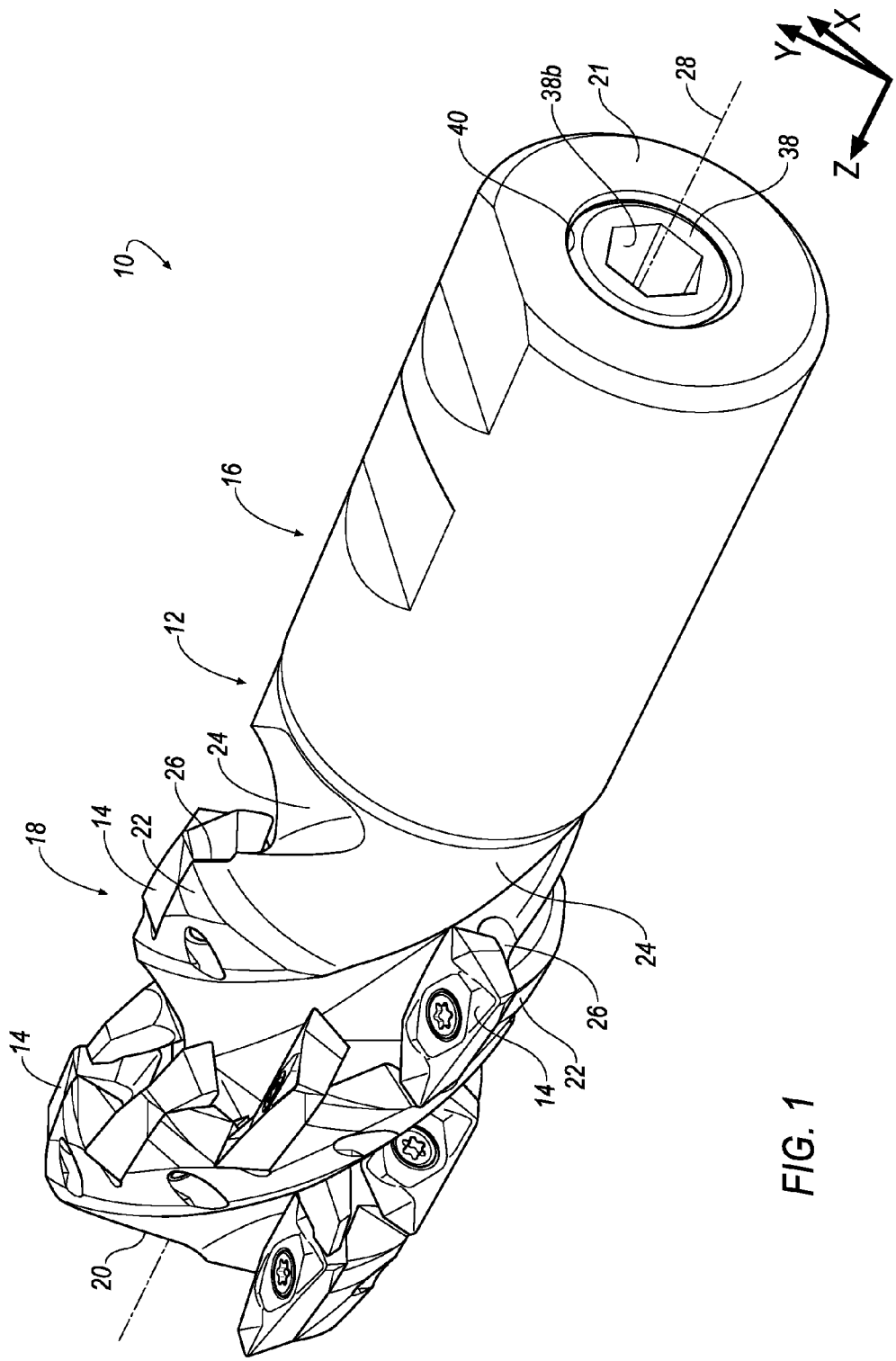
FIG. 1 is a perspective view of a rotary cutting tool with a vibration damping device according to an exemplary embodiment of the invention.
Figure 2:
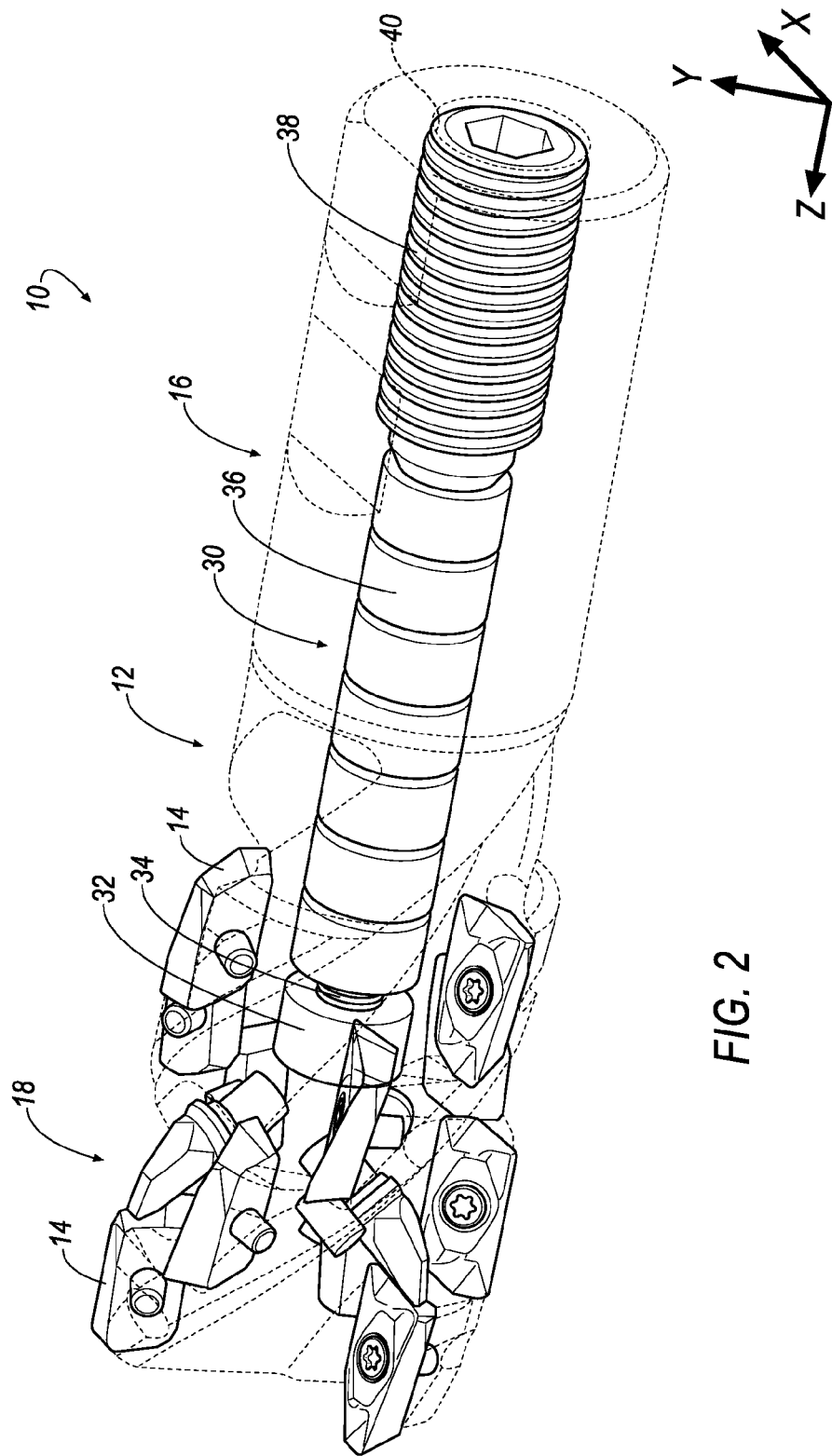
FIG. 2 is a perspective view of the rotary cutting tool of FIG. 1 with the shank and head removed to more clearly show the vibration damping device disposed with a cavity of the cutting tool.
Figure 3:
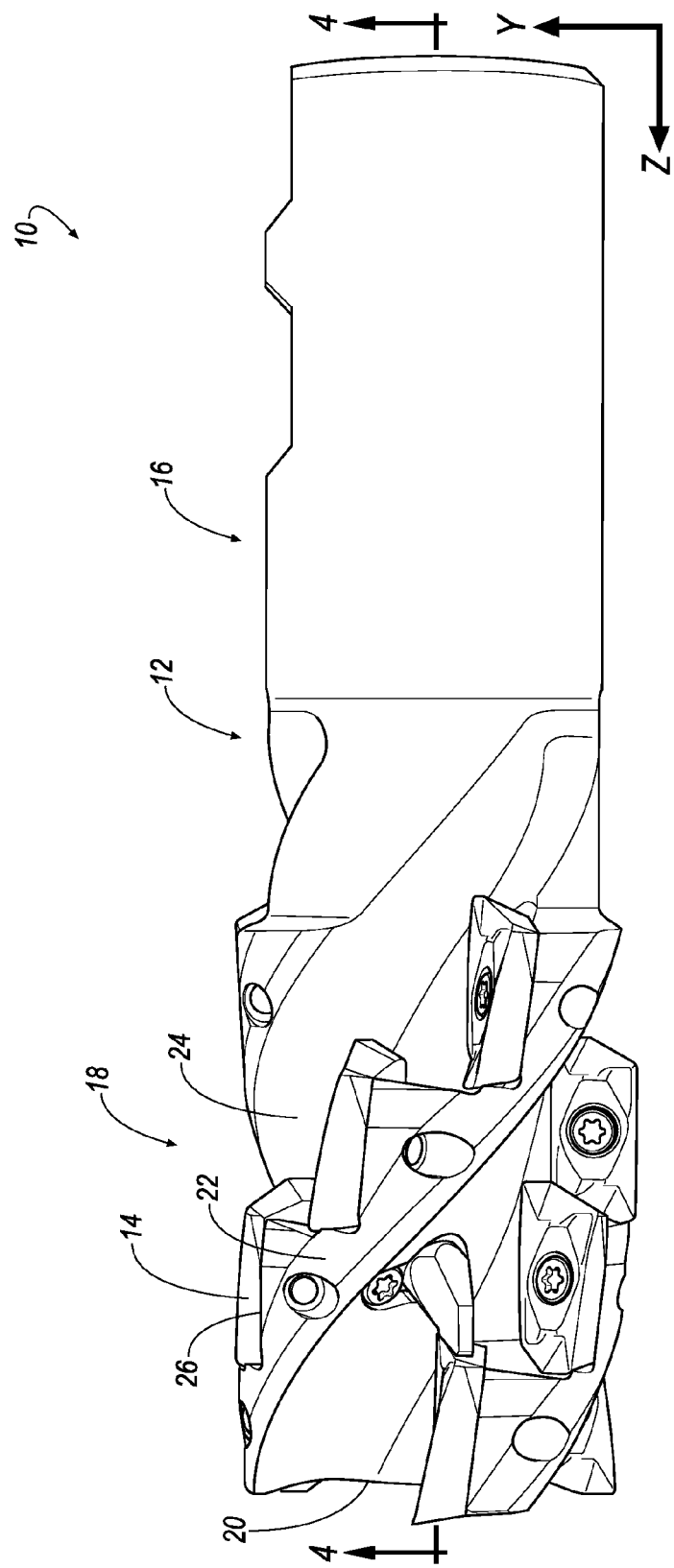
FIG. 3 is a side view of the rotary cutting tool of FIG. 1.

Referring now to FIGS. 1-3, a rotary cutting tool, shown generally at 10, includes a cutter body 12 that is embodied as a helical end mill with a plurality of indexable cutting inserts 14 for ramping, circle interpolating, facing and end milling. Although the cutting inserts 14 are shown in a helical end mill embodiment, the cutting inserts 14 are designed for use in any type of milling, such as shell end milling, face milling, fly cutting, and the like.

The cutter body 12 is of an elongated and generally cylindrical shape. The cutter body 12 comprises a shank 16 and a head 18. The shank 16 is configured so as to be capable of insertion and securing within the spindle of a milling machine (not shown) as is well known in the art. The shank 16 may be of any shape or design so as to be capable of this insertion and securing. Such designs include, but are not limited to, V-flange, taper, shell mill mount, and Weldon shank.

The head 18 is a generally cylindrical body that extends axially from the shank 16 to a forward end 20, thereby defining an exterior surface 22 therebetween. The exterior surface 22 of the head 18 preferably includes a plurality of helical chip grooves or flutes 24 formed therein. It will be appreciated that the invention is not limited by the number of helical chip grooves 24. In the illustrated embodiment, two grooves out of a total of three grooves are shown in FIG. 1, although any number of helical grooves are contemplated by the invention. Each chip groove 24 is preferably cut into the exterior surface 22 in a helical or spiral manner that extends from the forward end 20 to substantially the shank 16. A plurality of pockets 26 are disposed adjacent each helical chip groove 24. Each pocket 26 is capable of receiving a respective cutting insert 14 mounted thereon. The cutting tool 10 has a central, longitudinal axis 28 (in the direction of the z-axis).

Figure 4:
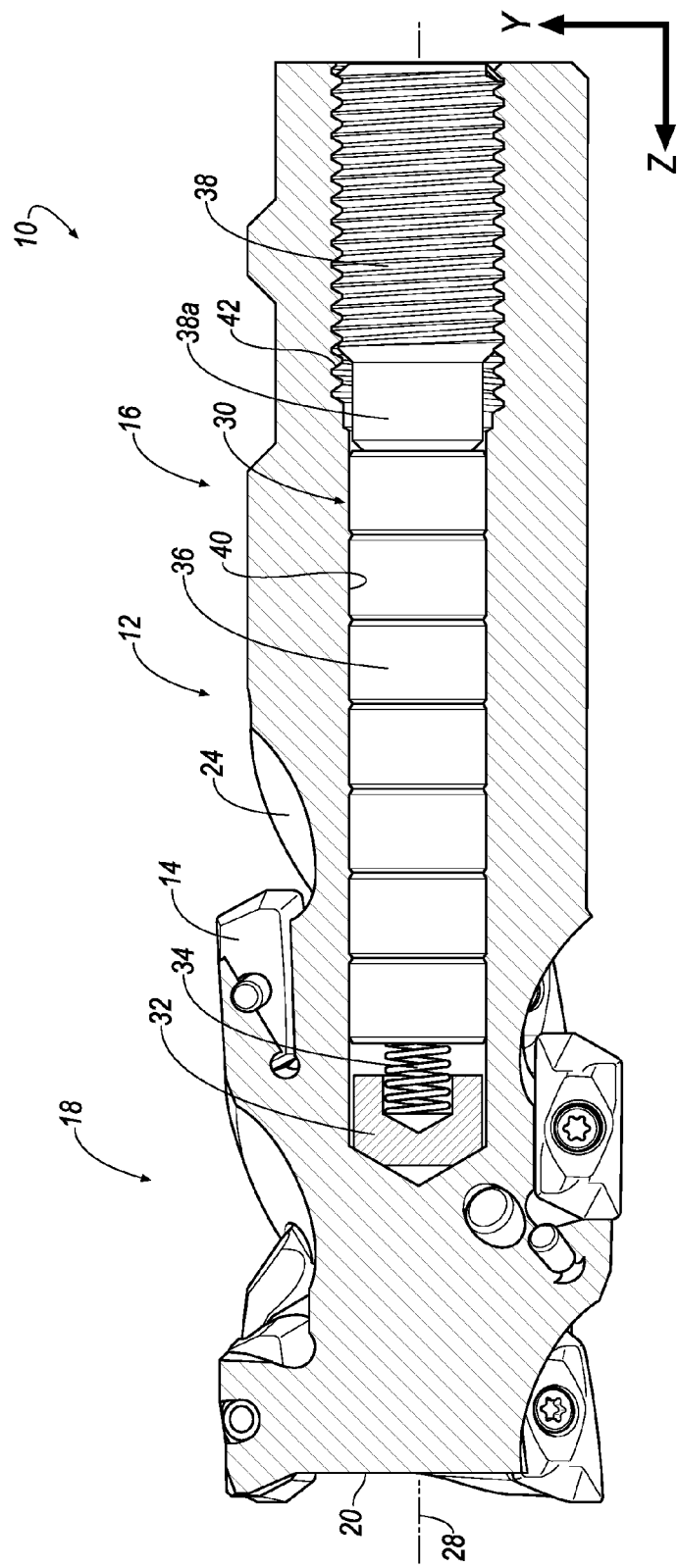
FIG. 4 is a cross-sectional view of the rotary cutting tool taken along line 4-4 of FIG. 3.
Figure 5:
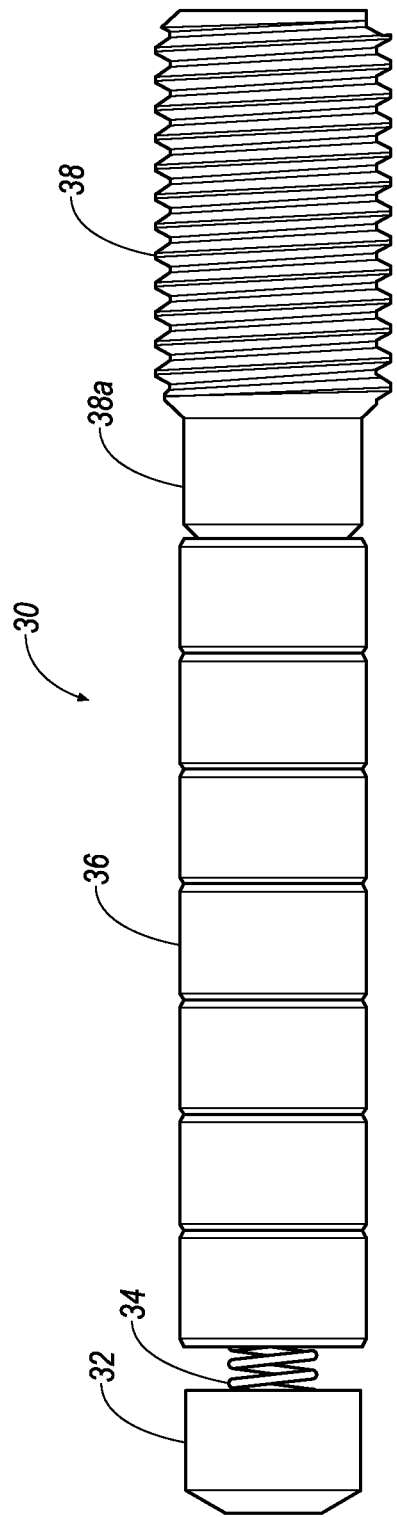
FIG. 5 is a side view of the vibration damping device according to an embodiment of the invention.

Referring now to FIGS. 2, 4 and 5, one aspect of the invention is that the cutting tool 10 includes a vibration damping device, shown generally at 30, for damping vibration that is disposed within a cylindrical-shaped cavity 40 that extends from a rearward end 21 of the cutting body 12. The vibration damping device 30 includes a stop member 32 at one end, a biasing member 34, such as a compression spring, a plurality of weight elements 36, and a threaded member 38, such as a set screw, at the other end. One end 38a of the threaded member 38 may be non-threaded and cylindrical-shaped so as to have approximately the same diameter as the weight elements 36 (i.e., slightly smaller than the inner diameter of the cavity 40). The opposite end 38b of the threaded member 38 may have a hexagonal-shaped recess 38b for receiving a tool (not shown), such as an Allen wrench, and the like.

In the illustrated embodiment, the cavity 40 extends entirely through the shaft 16 and partially into the head 18 of the cutter body 12 along the central, longitudinal axis of the cutter body 12. However, it will be appreciated that the invention is not limited by the amount that the cavity 40 extends into the cutter body 12. For example, the cavity 40 may only extend into the shaft 16 of the cutter body 12, so long as there is sufficient engagement of the weight elements 36 when the threaded member 38 is threaded into the cavity 40. One end of the cavity 40 has threads 42 (FIG. 4) for threadingly receiving the threaded member 38 of the vibration damping device 30.

In the illustrated embodiment, the weight elements 36 are cylindrical-shaped in the form of discs or rings having an outside diameter, all of which are at least slightly smaller in diameter than the inside diameter of the cavity 40. Likewise, the outside diameter of some, if not all of the weight elements 36 are slightly different from each other. The weight elements 36 are disposed within the cavity 40 in a random manner with respect to the outside diameters thereof. Typically, three to five different diameters varying at a few thousandths of an inch from each other is sufficient with the individual weight elements 36 being from two to four thousandths of an inch or so smaller in diameter than the inside diameter of the cavity 40.

The weight elements 36 are made of an extremely high density metal, a suitable composition for this purpose consisting of an alloy of about ninety percent tungsten and about ten percent nickel copper alloy. The specific gravity of this composition is about seventeen, thereby providing for extremely heavy weight elements 36 for their volume.

In addition, composition of the weight elements 36 is quite hard, and the cutter body 12 is made of hard material so that lateral movement of the weight elements 36 in the cavity 40 will transmit shocks to the cavity 40. The weight elements 36 are held in face to face engagement by the biasing member 34 such that the weight elements 36 are slightly frictionally restrained against absolute free lateral movement (i.e., in the radial direction with respect to the longitudinal axis 28) within the cavity 40.

To assemble the vibration damping device 30 within the cavity 40, the stop member 32 is inserted into the cavity 40. Then, the biasing member 34 is inserted into the cavity 40 adjacent the stop member 32. The biasing member 34 can be partially received in the stop member 32 to prevent unwanted movement of the biasing member 34 within the cavity 40. Then, the weight elements 36 with varying outside diameters are randomly inserted into the cavity 40. Lastly, the threaded member 38 is threaded into the cavity 40 until the weight element 36 are slightly frictionally restrained against absolute free lateral movement within the cavity 40.

During operation of the cutting tool 10, the weight elements 36 vibrate in the cavity 40 at multiple frequencies due to the varying relationship of their outside diameters to the inside diameter of the cavity 40. Most, if not all, of these frequencies will differ from the fundamental chatter frequency of the cutting tool 10 because the weight elements 30 have different degrees of freedom of movement within the cavity 40. As a result, the impact of the weight elements 30 against the cavity 40 will be at random frequency, thereby dampening the vibration of the cutting tool 10, rather than synchronizing and reinforcing the chatter frequency, during a machining operation.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutter body having a forward end, a rearward end, the cutter body including a head, a shank, and a cavity extending from the rearward end toward the forward end along a central, longitudinal axis of the cutter body, the cavity having threads at one end thereof, the head including at least one chip groove extending rearwardly from the forward end, the head further including at least one cutting insert mounted in a pocket adjacent to at least one chip groove; and
   a vibration damping device disposed within the cavity, the vibration damping device including a stop member at one end, a threaded member at an opposite end, a plurality of solid, cylindrical-shaped weight elements disposed between the stop member and the threaded member, and a biasing member disposed between the stop member and the plurality of weight elements, at least one of the plurality of weight elements having an outside diameter that is different than an outside diameter of another one of the plurality of weight elements to cause the plurality of weight elements to vibrate in the cavity at a plurality of different frequencies, wherein one end of the threaded member is non-threaded and contacting the plurality of weight elements such that the plurality of weight elements are slightly frictionally restrained against absolute free lateral movement within the cavity, and wherein an opposite end of the threaded member includes a recess to allow the threaded member to be threaded into the cavity, and wherein at least some of the plurality of frequencies are different than a fundamental chatter frequency of the cutting tool, thereby dampening vibration of the rotary cutting tool during a machining operation.

2. The rotary cutting tool according to claim 1, wherein the cavity extends entirely through the shaft and partially into the head of the cutter body.

3. The rotary cutting tool according to claim 1, wherein the weight elements are held in face to face engagement by the biasing member such that the weight elements are slightly frictionally restrained against absolute free lateral movement within the cavity when the vibration damping device is assembled in the rotary cutting tool.

4. The rotary cutting tool according to claim 1, wherein the weight elements are disposed within the cavity in a random manner with respect to the outside diameters thereof.

5. The rotary cutting tool according to claim 1, wherein the biasing member is partially received in the stop member to prevent unwanted movement of the biasing member within the cavity.

6. The rotary cutting tool according to claim 1, wherein one end of the threaded member is non-threaded and cylindrical-shaped with an outside diameter slightly smaller than the inside diameter of the cavity for contacting the plurality of weight elements in such a way so that the plurality of weight elements are frictionally restrained against absolute free lateral movement within the cavity.

7. The rotary cutting tool according to claim 1, wherein one end of the cavity has threads for threadingly receiving the threaded member of the vibration damping device.

8. The rotary cutting tool according to claim 1, wherein the rotary cutting tool comprises a helical end mill.

9. The rotary cutting tool according to claim 1, wherein that at least one chip groove is cut into an exterior surface of the cutting body in a helical or spiral manner.

10. The rotary cutting tool according to claim 1, wherein the biasing member comprises a compression spring.

11. A helical end mill, comprising:
a cutter body having a forward end, a rearward end, the cutter body including a head, a shank, and a cavity extending from the rearward end toward the forward end along a central, longitudinal axis of the cutter body, the head further including at least one cutting insert mounted in a pocket adjacent to a helical chip flute; and
a vibration damping device disposed within the cavity, the vibration damping device including a stop member at one end, a threaded member at an opposite end capable of being threadingly received within the cavity, a plurality of solid, cylindrical-shaped weight elements disposed between the stop member and the threaded member, and a spring disposed between the stop member and the plurality of weight elements for biasing the plurality of weight elements, the plurality of weight elements being cylindrical in shape and having a different outside diameter from each other to cause the plurality of weight elements to vibrate in the cavity at a plurality of different frequencies, wherein one end of the threaded member is non-threaded and contacting the plurality of weight elements such that the plurality of weight elements are slightly frictionally restrained against absolute free lateral movement within the cavity, and wherein an opposite end of the threaded member includes a recess to allow the threaded member to be threaded into the cavity, and wherein at least some of the plurality of frequencies of the plurality of weight elements are different than a fundamental chatter frequency of the cutting tool, thereby dampening vibration of the rotary cutting tool during a machining operation.

12. The helical end mill according to claim 11, wherein the cavity extends entirely through the shaft and partially into the head of the cutter body.

13. The helical end mill according to claim 11, wherein the weight elements are held in face to face engagement by the compression spring such that the weight elements are slightly frictionally restrained against absolute free lateral movement within the cavity when the vibration damping device is assembled in the helical end mill.

14. The helical end mill according to claim 11, wherein the weight elements are disposed within the cavity in a random manner with respect to the outside diameters thereof.

15. The helical end mill according to claim 11, wherein the compression spring is partially received in the stop member to prevent unwanted movement of the compression spring within the cavity.

16. The helical end mill according to claim 11, wherein one end of the threaded member is non-threaded and cylindrical-shaped with an outside diameter slightly smaller than the inside diameter of the cavity for contacting the plurality of weight elements in such a way so that the plurality of weight elements are frictionally restrained against absolute free lateral movement within the cavity.

17. A rotary cutting tool, comprising:
a cutter body having a forward end, a rearward end, the cutter body including a head, a shank, and a cavity extending from the rearward end toward the forward end along a central, longitudinal axis of the cutter body, the cavity having threads at one end thereof, the head including at least one chip groove extending rearwardly from the forward end, the head further including at least one cutting insert mounted in a pocket adjacent to at least one chip groove; and
a vibration damping device disposed within the cavity, the vibration damping device including a stop member at one end of the cavity, a threaded member at an opposite end of the cavity, a plurality of weight elements disposed between the stop member and the threaded member, and a biasing member disposed between the stop member and the plurality of weight elements, wherein at least one of the plurality of weight elements having an outside diameter that is different than an outside diameter of another one of the plurality of weight elements to cause the plurality of weight elements to vibrate in the cavity at a plurality of different frequencies, and wherein one end of the threaded member is non-threaded and contacting the plurality of weight elements such that the plurality of weight elements are slightly frictionally restrained against absolute free lateral movement within the cavity, and wherein an opposite end of the threaded member includes a recess to allow the threaded member to be threaded into the cavity, and wherein at least one of the plurality of frequencies is different than a fundamental chatter frequency of the cutting tool, thereby dampening vibration of the rotary cutting tool during a machining operation.

18. The rotary cutting tool according to claim 17, wherein the cavity extends entirely through the shaft and partially into the head of the cutter body.

19. The rotary cutting tool according to claim 17, wherein the weight elements are disposed within the cavity in a random manner with respect to the outside diameters thereof.

20. The rotary cutting tool according to claim 17, wherein the biasing member is partially received in the stop member to prevent unwanted movement of the biasing member within the cavity.

\* \* \* \* \*